United States Patent
Taniguchi et al.

(10) Patent No.: US 9,017,213 B2
(45) Date of Patent: Apr. 28, 2015

(54) FASTENING STRUCTURE OF RING GEAR

(75) Inventors: Makoto Taniguchi, Susono (JP);
Hiroyuki Shioiri, Numazu (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 295 days.

(21) Appl. No.: 13/641,819

(22) PCT Filed: May 19, 2010

(86) PCT No.: PCT/JP2010/058450
§ 371 (c)(1),
(2), (4) Date: Oct. 17, 2012

(87) PCT Pub. No.: WO2011/145189
PCT Pub. Date: Nov. 24, 2011

(65) Prior Publication Data
US 2013/0035196 A1  Feb. 7, 2013

(51) Int. Cl.
*F16H 57/08* (2006.01)
*F16H 48/38* (2012.01)
*F16H 55/17* (2006.01)

(52) U.S. Cl.
CPC .......... *F16H 48/38* (2013.01); *F16H 2048/385* (2013.01); *F16H 2048/382* (2013.01); *F16H 55/17* (2013.01)

(58) Field of Classification Search
USPC .......................... 29/509–513, 522.1; 475/331
See application file for complete search history.

(56) References Cited

FOREIGN PATENT DOCUMENTS

| | | |
|---|---|---|
| EP | 0647789 B1 | 5/2000 |
| JP | 55-075515 U | 5/1980 |
| JP | 03-022153 U | 3/1991 |
| JP | 2001-124181 A | 5/2001 |

OTHER PUBLICATIONS

International Search Report of PCT/JP2010/058450 mailed Jul. 13, 2010.

*Primary Examiner* — Derek D Knight
(74) *Attorney, Agent, or Firm* — Kenyon & Kenyon LLP (57) ABSTRACT

Disclosed is a fastening structure of a ring gear, wherein a ring gear is fastened to a flange of a differential case constituting a differential subassembly. The ring gear has an inner peripheral surface to be press-fitted to the outer peripheral surface of the flange, and is swaged by a swaging portion provided on at least one end of the flange in the axial direction. In order to prevent the ring gear from deforming in the radial direction, an engaging means for engaging the flange with the ring gear using the relationship between a recess and a protrusion is provided. The engaging means is comprised of a recess formed at an end face of the ring gear and a protrusion formed on the flange. The protrusion is engaged in the recess by swaging.

3 Claims, 14 Drawing Sheets

FASTENING STRUCTURE OF RING GEAR

CROSS-REFERENCE TO RELATED APPLICATIONS

This is a 371 national phase application of PCT/JP2010/058450 filed on 19 May 2010, the entire contents of which are incorporated herein by reference.

TECHNICAL FIELD

The present invention is related to a differential sub-assembly mounted on a vehicle, and more particularly, to a ring gear fastening structure fastening a ring gear to a differential case constituting a differential sub-assembly.

BACKGROUND ART

Heretofore, as one example of techniques in this field, for example, Patent Document 1 listed below discloses the technique that a ring gear is press-fitted to an outer circumferential surface of a flange of a differential case, and after that, both ends of the ring gear are swaged or deformed at both ends of the flange so as to fix the ring gear. Then, predetermined components as well as the ring gear are assembled to the case, and thereby a differential sub assembly used for a power transmission mechanism of a vehicle is obtained.

RELATED ART DOCUMENTS

Patent Documents

Patent Document 1: EP0647789B1
Patent Document 2: JP2001-124181A

SUMMARY OF INVENTION

Problems to be Solved by the Invention

However, when the differential sub-assembly having the fastening structure disclosed in Patent Document 1 is used for a power transmission mechanism of a vehicle, the ring gear is elastically deformed due to engagement reaction force generated when the ring gear is engaged with a counterpart gear. In this case, a part of an inner circumferential surface (press-fitting surface) of the ring gear is separated from the differential case to cause ununiform contact pressure on the press-fitting surface, having a possibility of reduction in fastening force.

Figure 14:
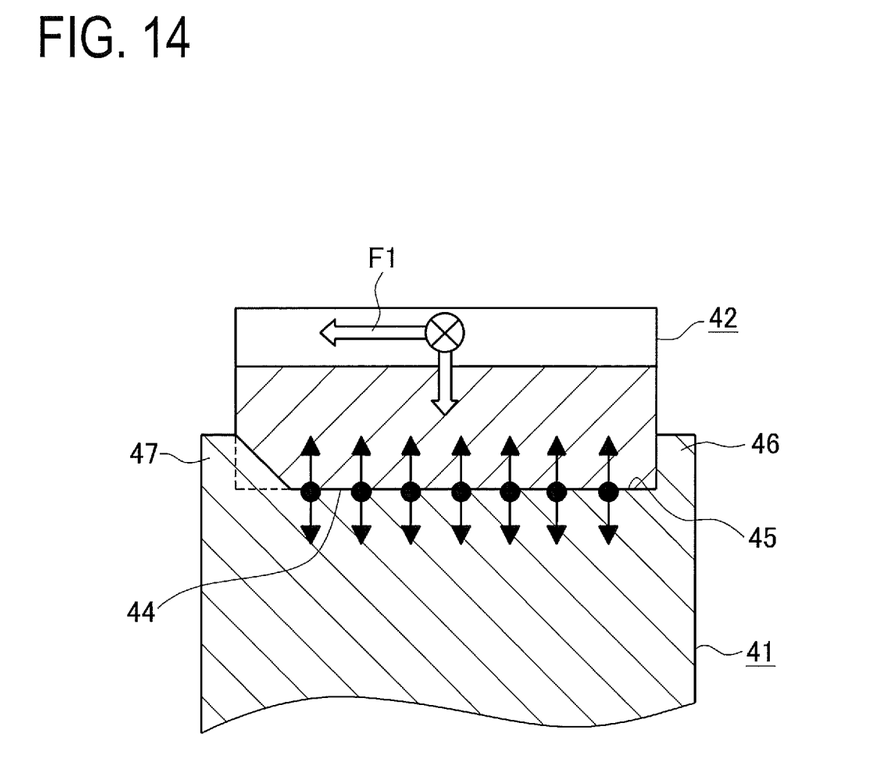
FIG. 14 is a schematic sectional view of a relationship between a flange of a differential case and a ring gear in a prior art.
Figure 15:
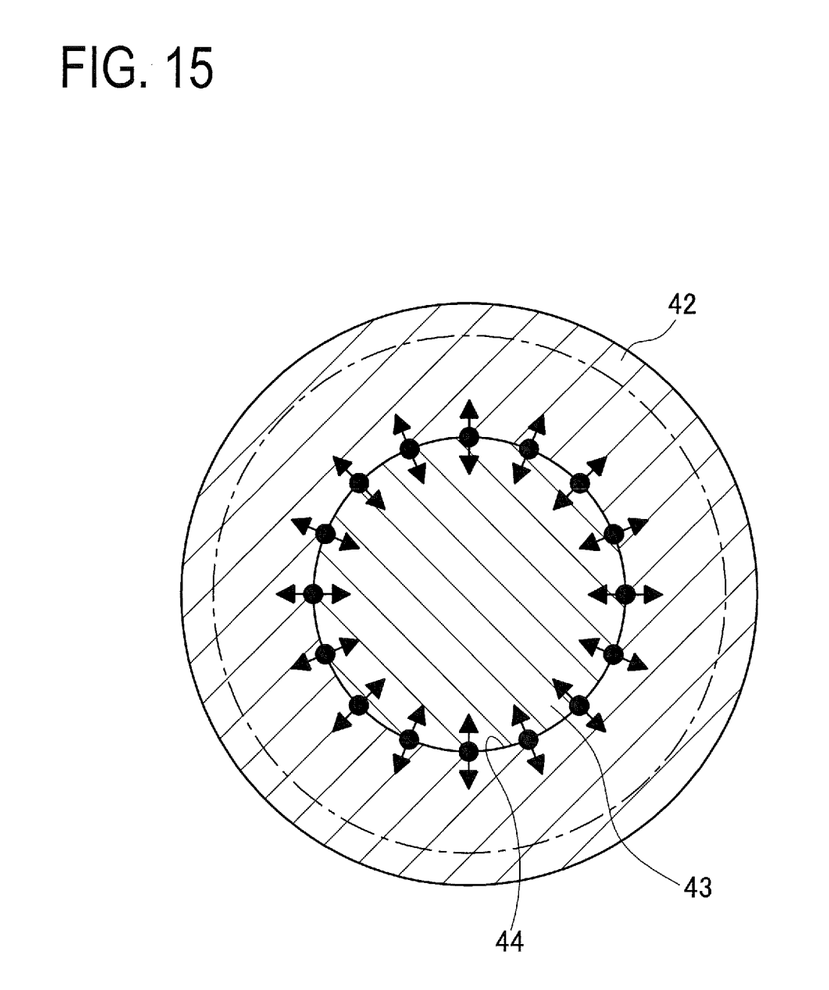
FIG. 15 is a schematic sectional view of a relationship between the differential case and the ring gear under no-load condition in the prior art.
Figure 16:
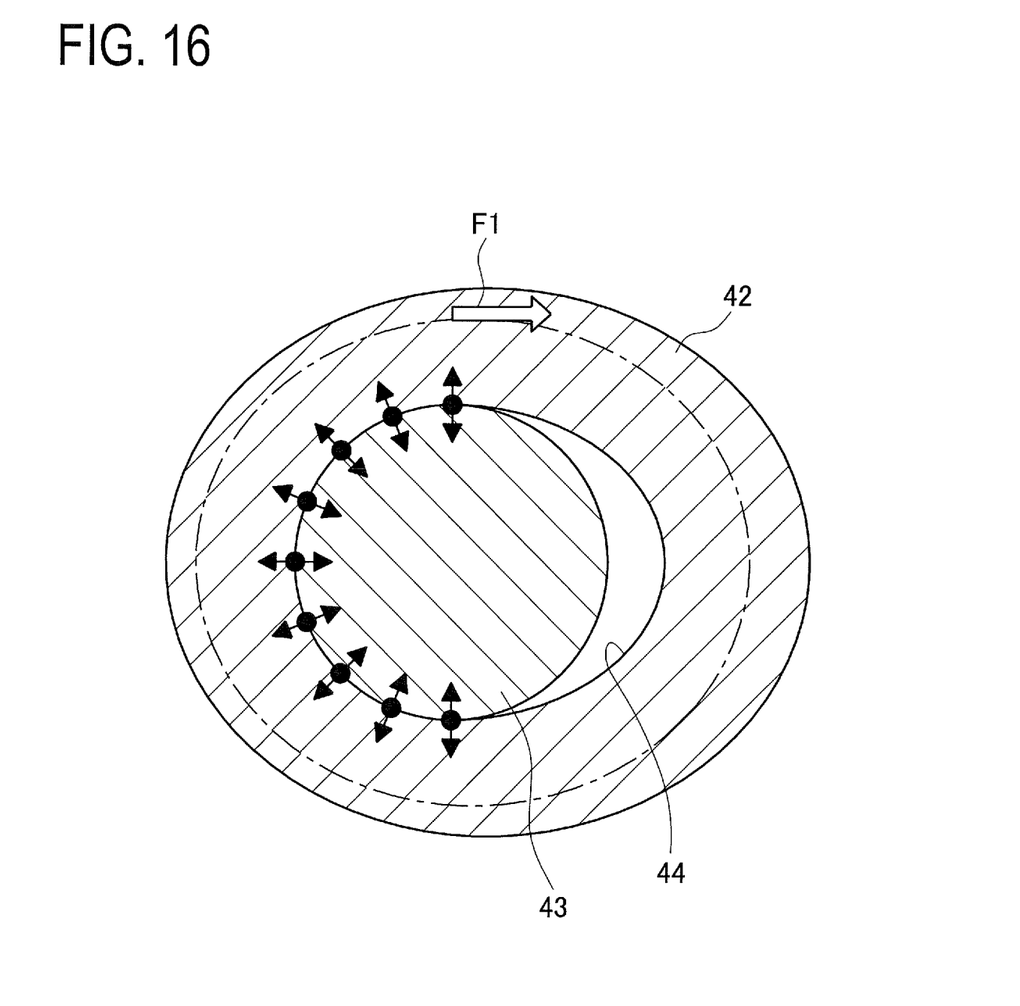
FIG. 16 is a schematic sectional view of a relationship between the differential case and the ring gear under load condition in the prior art.

FIG. 14 is a schematic sectional view of a differential case cut along an axial direction to show a relationship between a flange 41 of the differential case and a ring gear 42 after they are fastened together. FIGS. 15 and 16 are schematic sectional views of a differential case 43 cut along a radial direction to show a relationship between the differential case 43 and the ring gear 42 after they are fastened. In FIG. 14, while an inner circumferential surface (press-fitting surface) 44 of the ring gear 42 is press-fitted to an outer circumferential surface 45 of the flange 41, the ring gear 42 is swaged by a bank 46 formed in one end of the flange 41 and a swage part 47 formed in the other end to be fixed to the flange 41. In this state, engagement reaction force F1 generated on the ring gear 42 is transmitted to the differential case 43 as torque by cooperation of the "swage part 47" and "friction force against the contact pressure on the press-fitting surface 44." When the ring gear 42 is under no-load condition, uniform contact pressure arises on the press-fitting surface 44 of the ring gear 42 as indicated with arrows in FIG. 15. On the contrary, under load condition, the engagement reaction force F1 is generated on the ring gear 42 to elastically deform the ring gear 42 as shown in FIG. 16. Thereby, a part of the press-fitting surface 44 is separated form the differential case 43, leading to ununiform contact pressure state on the press-fitting surface 44. As a result, the total contact pressure on the press-fitting surface 44 declines and the torque to be transmitted from the ring gear 42 to the differential case 43 could decrease.

Figure 17:
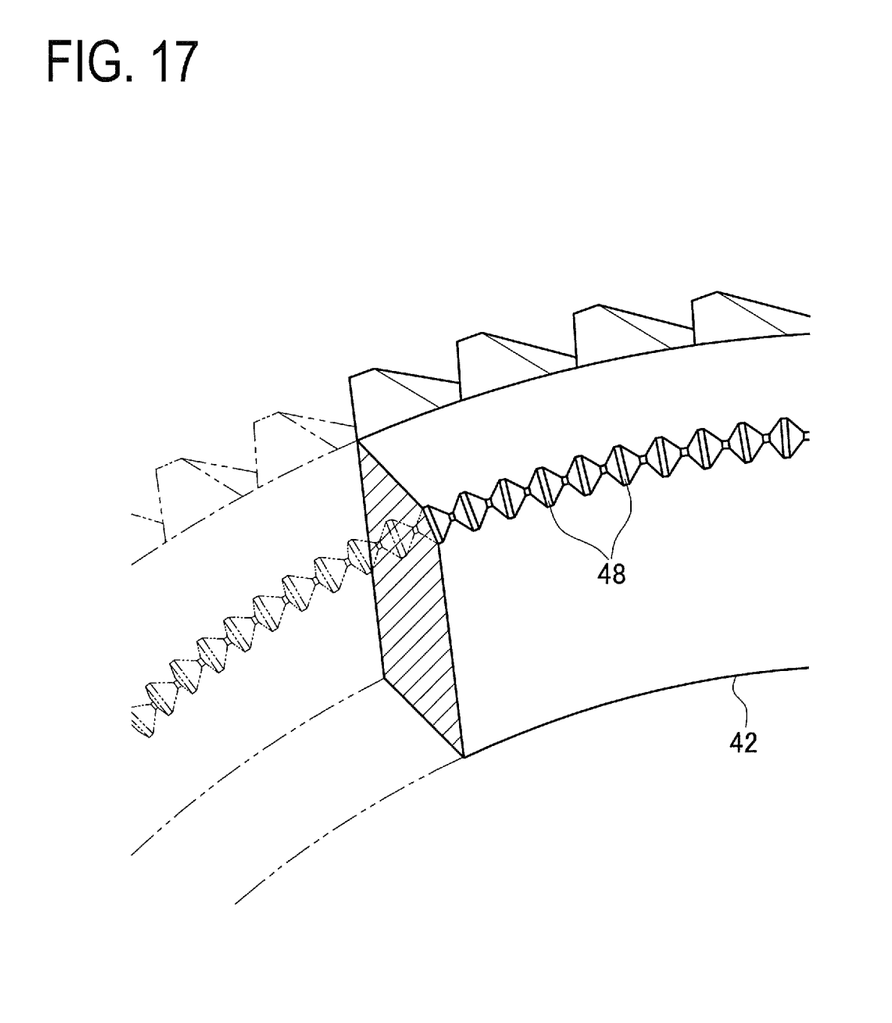
FIG. 17 is a partial perspective view of the ring gear in the prior art.

FIG. 17 shows a partial perspective view of the ring gear 42. On one side inner peripheral edge of the ring gear 42, a plurality of notches 48 are formed to be swaged by the swage part 47 of the flange 41. Heretofore, these notches 48 are swaged by the swage part 47 with plastic working. The notches 48 are formed on an inner side of the ring gear 42 and swaged such that the flange 41 is pushed to extend from inside to outside. Therefore, the swage part 47 of the flange 41 does not function to restrict deformation of the ring gear 42 in the direction which the press-fitting surface 44 of the ring gear 42 is separated from the flange 41 in FIG. 14.

The present invention has been made to solve the above problems and has a purpose to provide a fastening structure of a ring gear enabling to keep a uniform contact pressure on an inner circumferential surface (press-fitting surface) of the ring gear and to prevent decline of total contact pressure on the inner circumferential surface (press-fitting surface).

Means of Solving the Problems (1) One aspect of the present invention to achieve the above-mentioned purpose is a fastening structure of a ring gear to fasten the ring gear to a flange of a differential case constituting a differential sub-assembly, wherein an inner circumferential surface of the ring gear is press-fitted to an outer circumferential surface of the flange, the ring gear is swaged by a swaging part provided on at least one of both ends of the flange in an axial direction, and the fastening structure includes an engaging means for engagement between the flange and the ring gear in a recess-and-protrusion relationship to prevent deformation of the ring gear in a radial direction.

According to the configuration in (1), the differential sub-assembly is obtained by mounting prescribed components as well as the ring gear on the differential case. At this time, the engagement reaction force arises by the engagement of the ring gear and a counterpart gear when the differential sub-assembly is used for a motor transmission mechanism of a vehicle. Even though the ring gear tends to be elastically deformed in a radial direction due to this engagement reaction force, the deformation can be restricted by the engaging means engageable by a recess-protrusion relationship.

(2) To achieve the above-mentioned purpose, in the configuration mentioned in (1), preferably, the engaging means includes a recess formed in an end surface of the ring gear and a protrusion formed in the flange, the protrusion being engageable with the recess by swaging.

(3) To achieve the above-mentioned purpose, in the configuration mentioned in (1), preferably, the engaging means includes a protrusion formed in an end surface of the ring gear and a recess formed in the flange, the recess being configured in a manner that a protruding part formed in the flange is deformed by swaging.

(4) To achieve the above-mentioned purpose, in the configuration mentioned in (1), preferably, the engaging means includes a protrusion formed in an end surface of the ring gear and a recess formed in the flange, the recess being engaged with the protrusion when the ring gear is press-fitted to the outer circumferential surface of the flange.

According to the configuration mentioned in (4), comparing to the configurations in (2) and (3), the protrusion does not need to be deformed.

(5) To achieve the above-mentioned purpose, in the configuration mentioned in (4), preferably, the protrusion includes an engaging surface formed to be oblique with respect to a press-fitting direction of the ring gear and to be engaged with an engaged surface of the recess, the engaged surface is slanted with respect to the press-fitting direction of the ring gear, and the engaging surface has an angle of inclination larger than that of the engaged surface.

According to the configuration mentioned in (5), in addition to the effect of (4), the protrusion is press-fitted in the recess to stretch out the recess by the protrusion because of the relationship between the angle of the engaging surface and the angle of the engaged surface.

Effects of the Invention

According to the above mentioned configuration of the present invention, it can be achieved to maintain the uniform contact pressure on the inner circumferential surface (press-fitting surface) of the ring gear and to prevent decline in the total contact pressure on the inner circumferential surface (press-fitting surface).

MODE FOR CARRYING OUT THE INVENTION

First Embodiment

A first embodiment illustrating a fastening structure of a ring gear of the present invention is herein described in detail with reference to the accompanying drawings.

Figure 1:
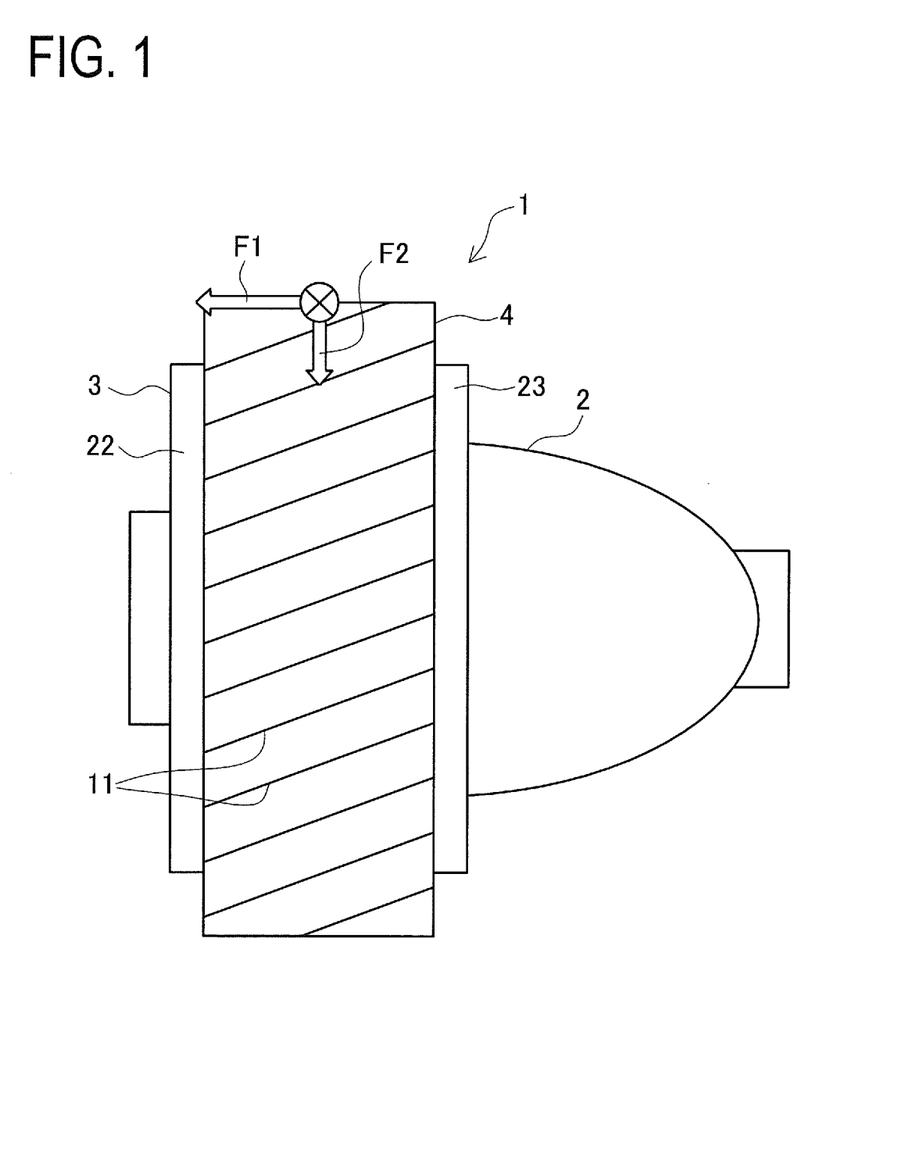
FIG. 1 is a side view showing a schematic configuration of a differential sub-assembly in a first embodiment.
Figure 2:
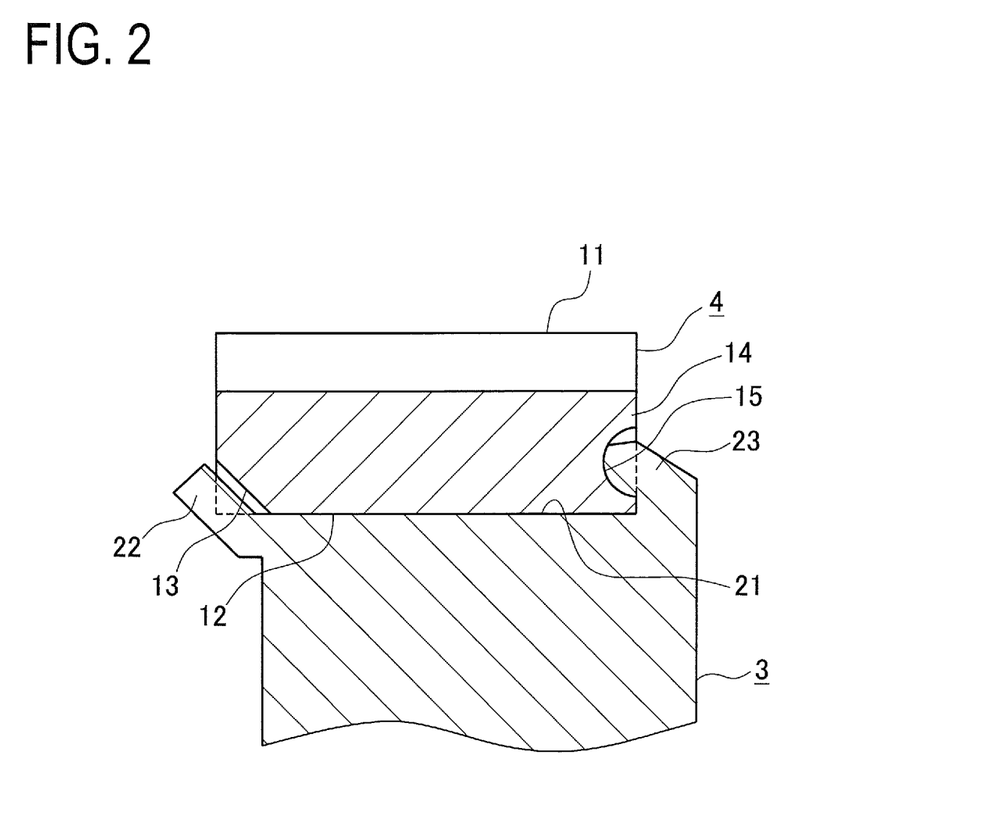
FIG. 2 is a schematic sectional view of a relationship between a flange of a differential case and a ring gear in the first embodiment.

FIG. 1 is a side view showing a schematic configuration of a differential sub-assembly (hereinafter, referred to as a differential sub-assy) 1. FIG. 2 is a schematic sectional view of a relationship between a flange 3 of a differential case 2 and a ring gear 4. As shown in FIG. 1, the differential sub-assy 1 is provided with the differential case 2, the flange 3 provided on one end (left side in the figure) of an outer circumference of the differential case 2, and the ring gear 4 of an annular shape fastened to an outer circumference of the flange 3. In the case 2, a pair of side gears and a pair of pinions (both are not shown in the figure) are stored and held in a rotatable manner.

This differential sub-assy 1 is used for a power transmission mechanism of a vehicle. For example, the differential sub-assy 1 is provided to a transmission, a transfer, and a final reduction gear of a vehicle. The differential sub-assy 1 is to transmit power, which is inputted from a counterpart gear (not shown) to the ring gear 4, to a rotation member connected to the pair of pinions as allowing the rotational difference of the pair of side gears. Herein, the rotation member may be such as a left-and-right pair of driving wheels and a front-and-rear pair of driving axles of a vehicle.

As shown in FIGS. 1 and 2, in the present embodiment, the ring gear 4 is formed of a helical gear in which a plurality of teeth 11 are formed on an outer circumference to be oblique with respect to an axial direction of the ring gear 4. A press-fitting surface 12 as an inner circumferential surface of the ring gear 4 is press-fitted to an outer circumferential surface 21 of the flange 3 as the ring gear 4 is swaged by the flange 3. Specifically, a first swage part 22 is formed on one end (left side in FIG. 2) in an axial direction of the flange 3. The ring gear 4 includes a plurality of notches 13 formed to be swaged by the first swage part 22 and slanted on a one side inner peripheral edge in the axial direction of the ring gear 4. These notches 13 are similar to the conventional notches 48 in FIG. 17.

Further, in the present embodiment, an engaging means using a relationship between a recess and a protrusion is provided between the flange 3 and the ring gear 4 in order to prevent deformation of the ring gear 4 in a radial direction. Specifically, a second swage part 23 as a protrusion of the present invention is formed on the other end (right side in FIG. 2) in the axial direction of the flange 3. This second swage part 23 may be sequentially formed along an outer circumference of the flange 3, or may be intermittently formed along the same. On a one end surface 14 of the ring gear 4, a circumferential groove 15 is formed to be engaged with the second swage part 23 in a recess-and-protrusion relationship. The circumferential groove 15 may be sequentially or intermittently formed along a circumference of the one end surface 14 of the ring gear 4 in accordance with the configuration of the second swage part 23. In the present embodiment, the second swage part 23 and the circumferential groove 15 constitute the above mentioned engaging means.

Then, while the notches 13 of the ring gear 4 are swaged by the first swage part 22, the one end surface 14 of the ring gear 4 is swaged by the second swage part 23 such that an end portion of the second swage part 23 is engaged with the circumferential groove 15 of the ring gear 4. In this manner, the ring gear fastening structure in which the ring gear 4 is fastened to the flange 3 of the differential case 2 is configured.

Figure 3:
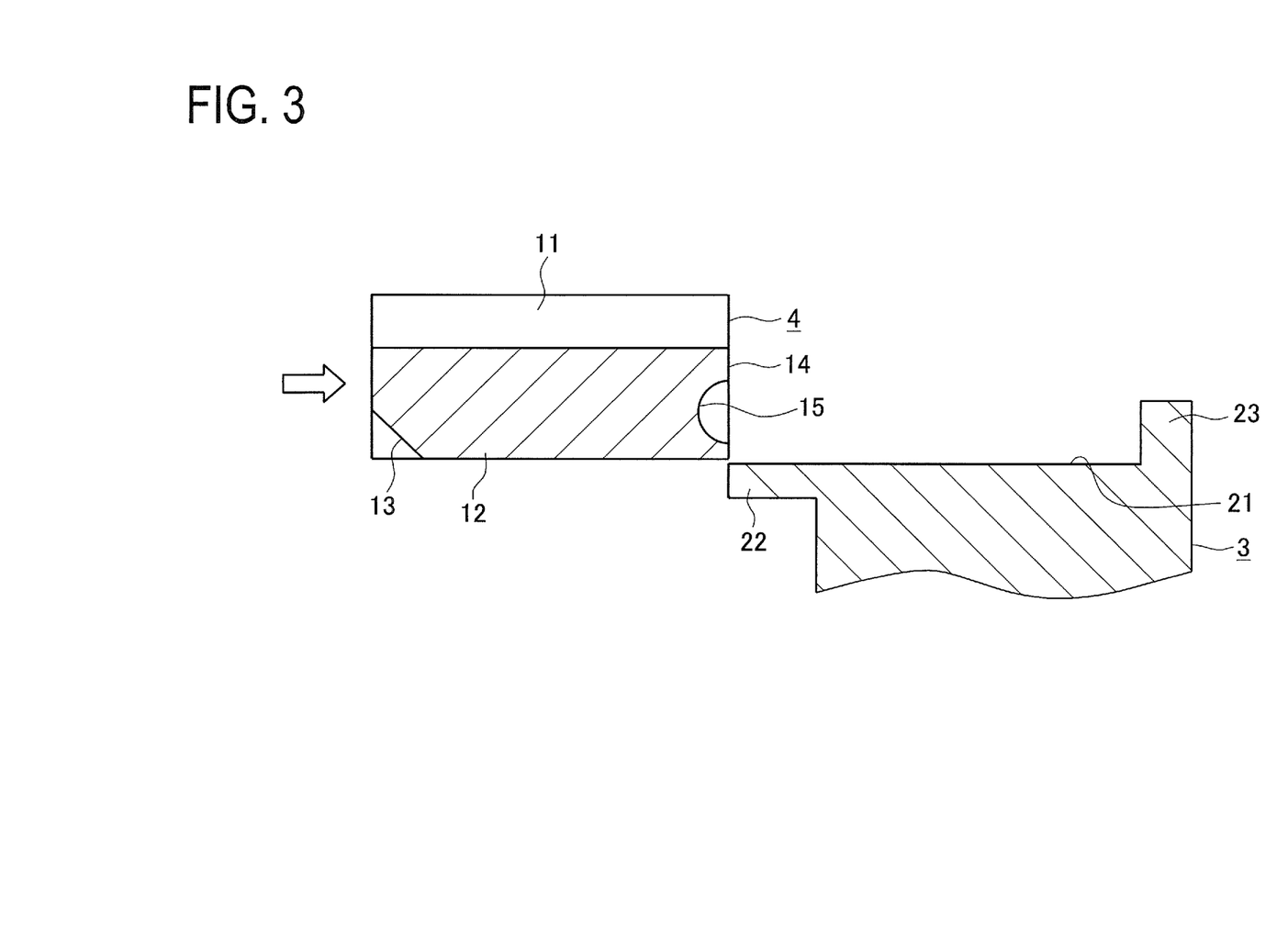
FIG. 3 is a schematic sectional view showing a press-fitting step of a fastening method in the first embodiment.
Figure 4:
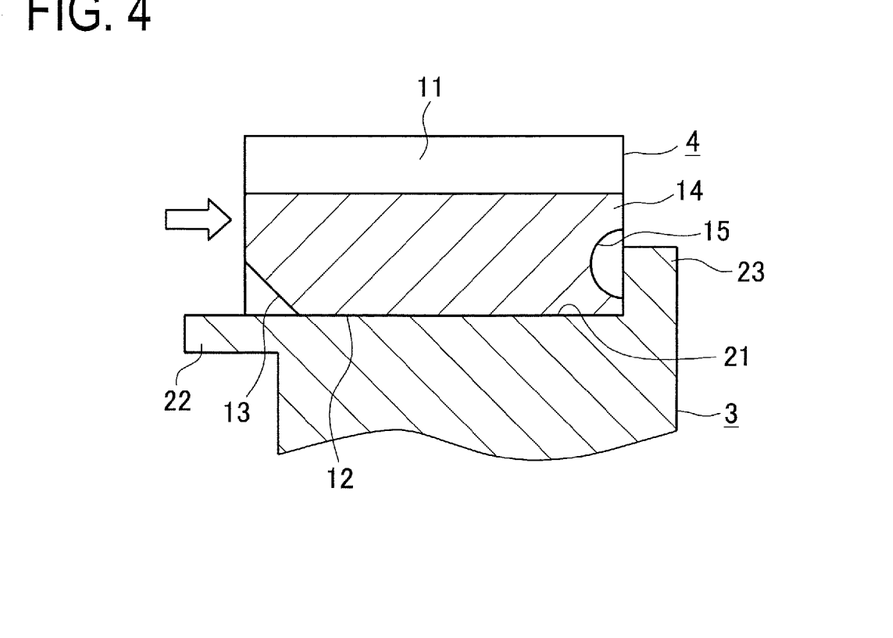
FIG. 4 is a schematic sectional view showing the press-fitting step of the fastening method in the first embodiment.
Figure 5:
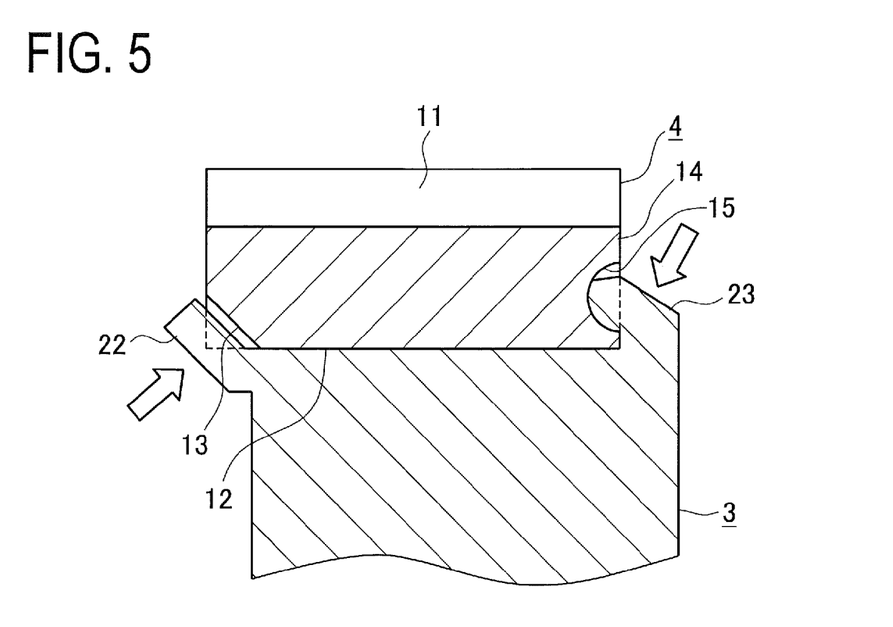
FIG. 5 is a schematic sectional view showing a swaging step of the fastening method in the first embodiment.

Next, a ring gear fastening method according to the present embodiment will be described. FIGS. 3 to 5 are schematic sectional views corresponding to FIG. 2, showing each step of the fastening method.

First, in a "press-fitting step" as shown in FIGS. 3 and 4, a press-fitting surface 12 of the ring gear 4 is press-fitted to the outer circumferential surface 21 of the flange 3. At this time, the first swage part 22 of the flange 3 is in a horizontally flat shape in parallel with the outer circumferential surface 21, and the second swage part 23 extends orthogonal to the outer circumferential surface 21. Then, the ring gear 4 is pressed until the one end surface 14 comes into contact with the second swage part 23 so as to be press-fitted as shown in FIG. 4. In this state, the press-fitting surface 12 of the ring gear 4 is in close contact with the outer circumferential surface 21 of the flange 3.

After that, in a "swaging step" as shown in FIG. 5, the first swage part 22 of the flange 3 is pressed against the notches 13 of the ring gear 4 to be swaged. Further, the second swage part 23 of the flange 3 is pressed against the one end surface 14 of the ring gear 4, and the end portion of the second swage part 23 is deformed and engaged with the circumferential groove 15 of the ring gear 4 to be swaged. In this state, the ring gear 4 is positioned in place in the axial and radial directions with respect to the flange 3 and fixed therein.

According to the ring gear fastening structure in the present embodiment as explained above, when the differential sub-assy 1 is used for a power transmission mechanism of a vehicle, the engagement reaction force F1 is generated as indicated with an arrow in FIG. 1 by the engagement of the ring gear 4 and the counterpart gear, and pressing force F2 is further generated on the press-fitting surface 12 of the ring gear 4. The ring gear 4 tends to be elastically deformed in the radial direction due to this engagement reaction force F1, but this elastic deformation can be restricted by the second swage part 23 and the circumferential groove 15 which are engaged in the recess-and-protrusion relationship. Accordingly, a part of the press-fitting surface 12 of the ring gear 4 is prevented from being separated from the outer circumferential surface 21 of the flange 3, and thus the contact pressure of the press-fitting surface 12 can be kept uniform. As a result, reduction in total contact pressure on the press-fitting surface 12 can be retrained, so that the torque transmitted from the ring gear 4 to the differential case 2 is prevented from declining.

Second Embodiment

A second embodiment illustrating the ring gear fastening structure of the present invention will be described in detail with reference to the accompanying drawings.

In the following explanation, same or similar elements as the first embodiment will be given the same reference numerals and not described again, and different point will be mainly explained.

Figure 6:
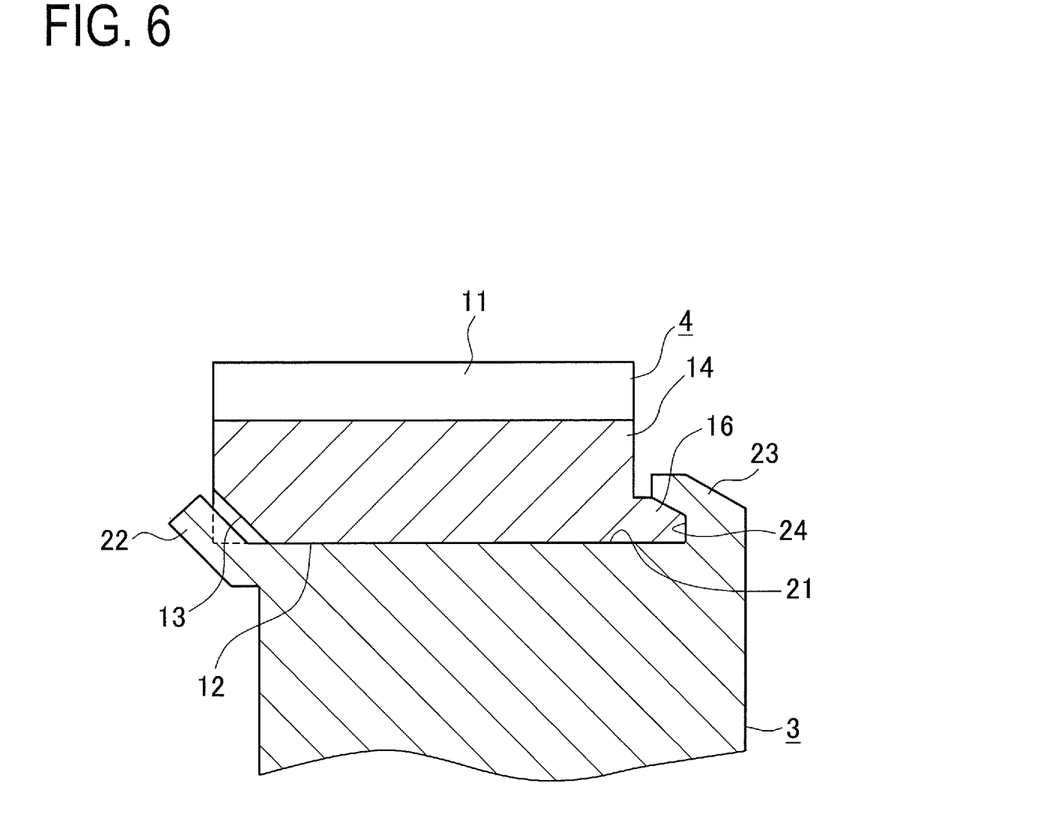
FIG. 6 is a schematic sectional view of a relationship between a flange of a differential case and a ring gear in a second embodiment.

FIG. 6 is a schematic sectional view corresponding to FIG. 2, showing a relationship between the flange 3 of the differential case 2 and the ring gear 4. The present embodiment is different form the first embodiment regarding the configuration of engaging means. Specifically, as shown in FIG. 6, an engaging means includes a flange portion 16 formed in the one end surface of the ring gear 4 as a protrusion of the present invention and a circumferential groove 24 formed in a one side peripheral edge of the flange 3 of the differential case 2 as a recess of the present invention. In the present embodiment, the flange portion 16 is formed in parallel with the press-fitting surface 12 of the ring gear 4 to protrude from the one end surface 14. Further, the circumferential groove 24 is configured by swaging the second swage part 23 formed in the one side peripheral edge of the flange 3 with the flange portion 16. In this state, the flange portion 16 of the ring gear 4 is engaged with the circumferential groove 24 of the flange 3 to restrict deformation of the ring gear 4 in the radial direction. The configuration of the first swage part 22 and the notches 13 is same as that of the first embodiment.

Figure 7:
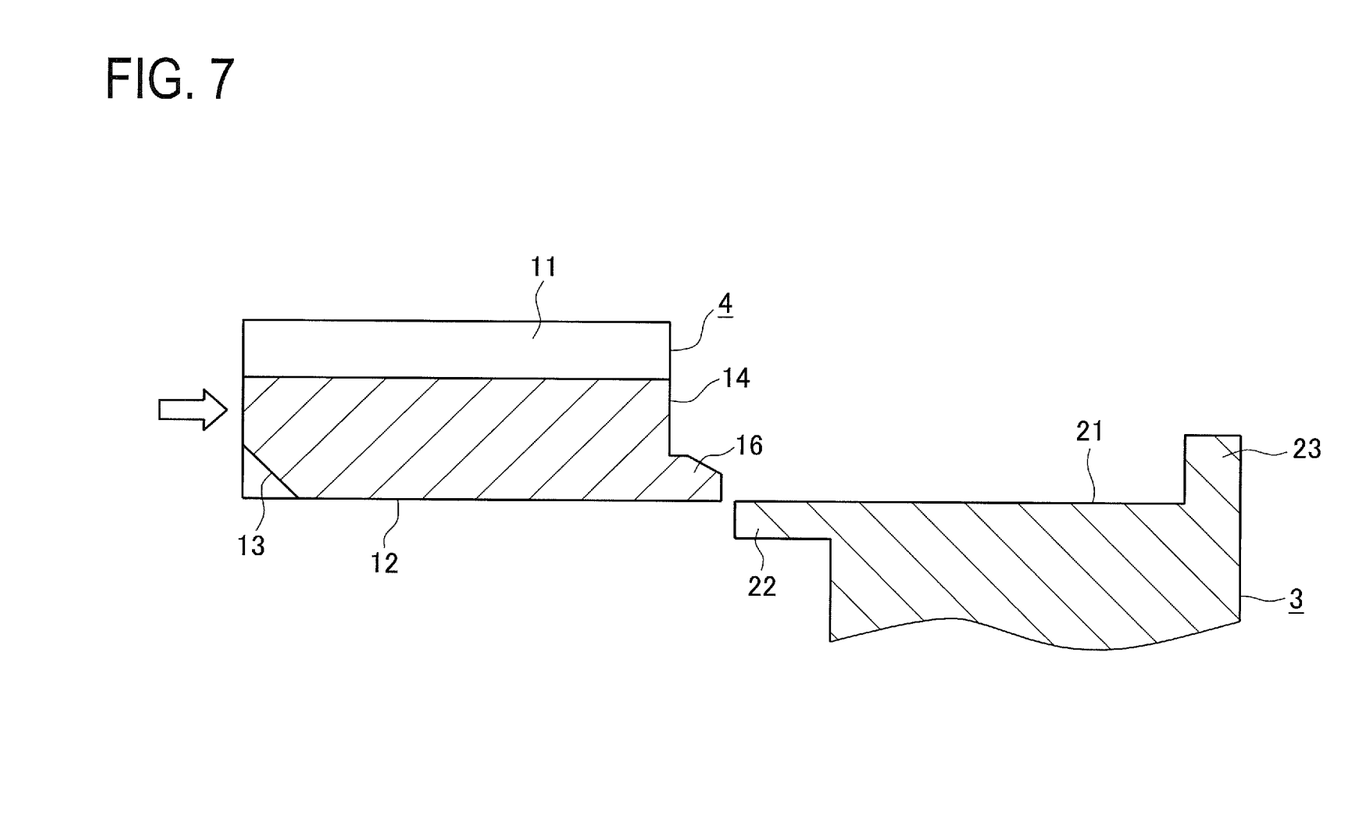
FIG. 7 is a schematic sectional view showing a press-fitting step of a fastening method in the second embodiment.
Figure 8:
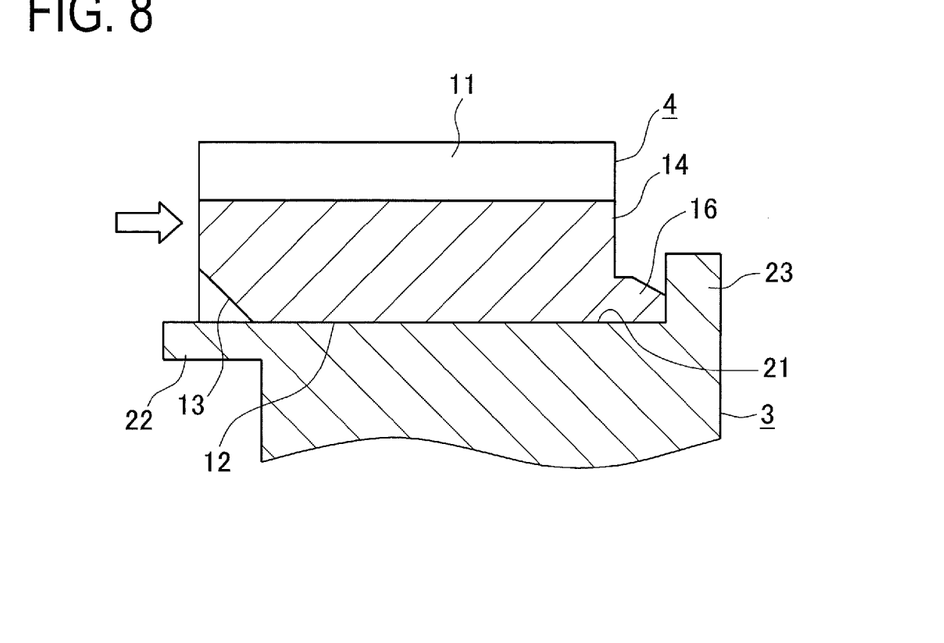
FIG. 8 is a schematic sectional view showing the press-fitting step of the fastening method in the second embodiment.
Figure 9:
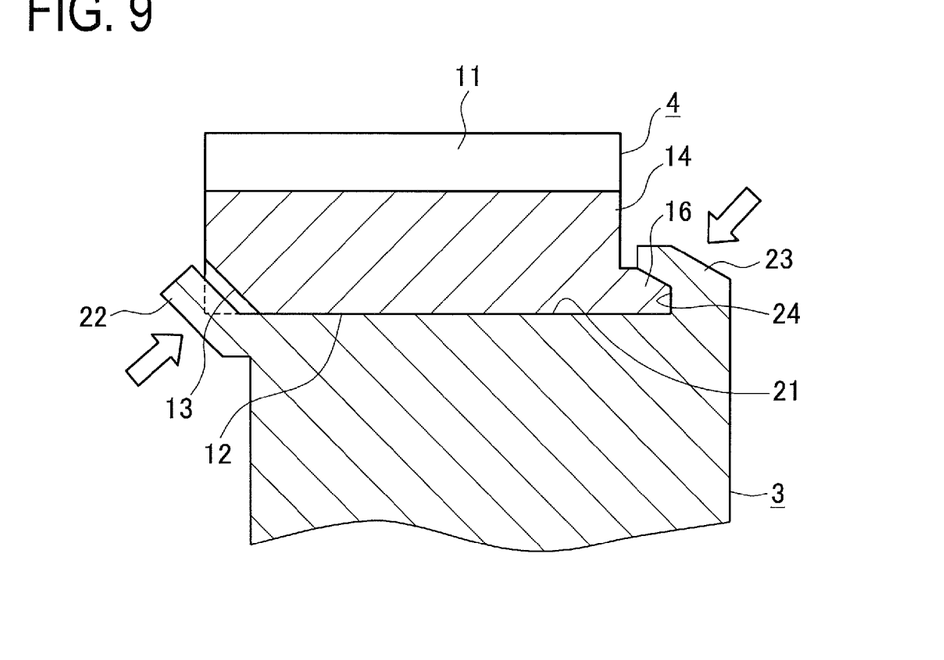
FIG. 9 is a schematic sectional view of a swaging step of the fastening method in the second embodiment.

Next, a ring gear fastening method according to the present embodiment will be described. FIGS. 7 to 9 are schematic sectional views corresponding to FIG. 2, showing each step of the fastening method.

First, in a "press-fitting step" as shown in FIGS. 7 and 8, the press-fitting surface 12 of the ring gear 4 is press-fitted on the outer circumferential surface 21 of the flange 3. At this time, the first swage part 22 of the flange 3 is in a horizontally flat shape in parallel with the outer circumferential surface 21, and the second swage part 23 extends orthogonal to the outer circumferential surface 21. Then, the ring gear 4 is pressed until an end of the flange portion 16 comes into contact with the second swage part 23 as shown in FIG. 8. In this state, the press-fitting surface 12 of the ring gear 4 is in close contact with the outer circumferential surface 21 of the flange 3.

After that, in a "swaging step" as shown in FIG. 9, the first swage part 22 of the flange 3 is pressed against the notches 13 of the ring gear 4 to be swaged. Further, the second swage part 23 of the flange 3 is pressed against the flange portion 16 of the ring gear 4 to be swaged. Thus, the flange portion 16 of the ring gear 4 is engaged with the circumferential groove 24 of the flange 3. In this state, the ring gear 4 is positioned in place in the axial and radial directions with respect to the flange 3 and fixed therein.

Consequently, also in the present embodiment, the elastic deformation of the ring gear 4 can be restricted by the engagement of the flange portion 16 of the ring gear 4 and the circumferential groove 24 of the flange 3 even if the ring gear 4 tends to be elastically deformed in the radial direction due to the engagement reaction force. Accordingly, a part of the press-fitting surface 12 of the ring gear 4 is prevented from being separated from the outer circumferential surface 21 of the differential case 3, and thus the contact pressure of the press-fitting surface 12 can be kept uniform. As a result, reduction in total contact pressure on the press-fitting surface 12 can be restrained, so that the torque transmitted from the ring gear 4 to the differential case 2 is prevented from declining.

Third Embodiment

A third embodiment illustrating the ring gear fastening structure of the present invention will be described in detail with reference to the accompanying drawings.

Figure 10:
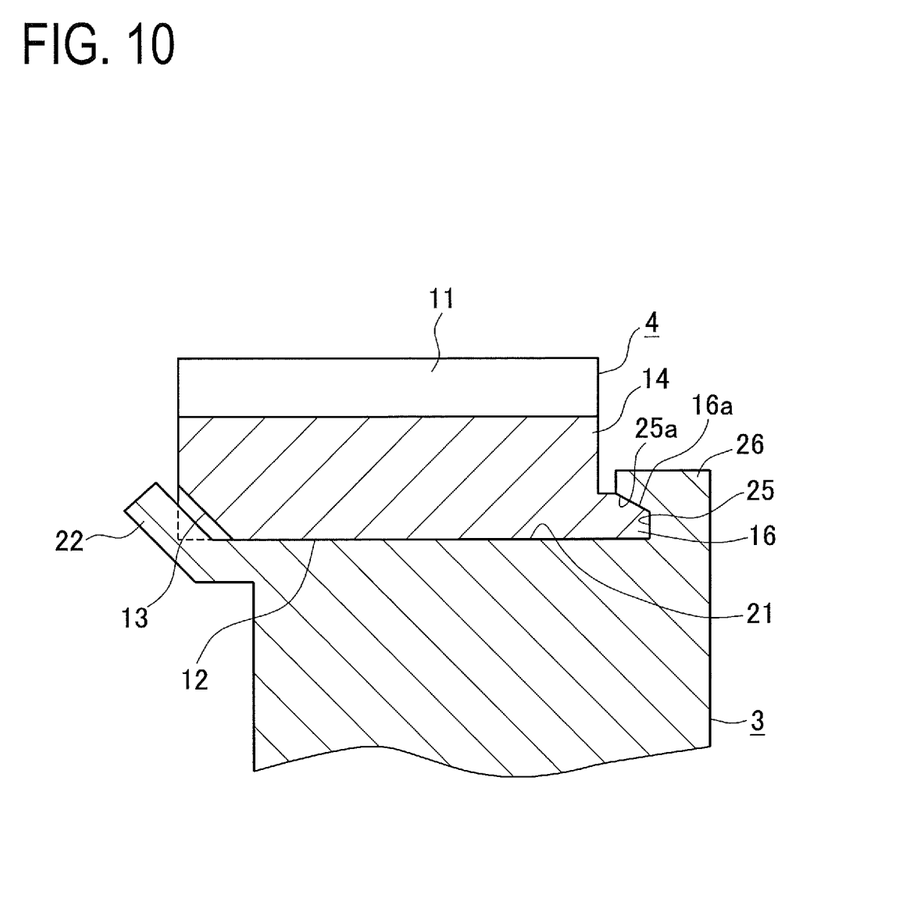
FIG. 10 is a schematic sectional view of a relationship between a flange of a differential case and a ring gear in a third embodiment.

FIG. 10 is a schematic sectional view corresponding to FIG. 2, showing a relationship between the flange 3 of the differential case 2 and the ring gear 4. Also in the present embodiment, configuration of an engaging means is different from those of the first and second embodiments. Specifically, as shown in FIG. 10, the engaging means of the present embodiment includes the flange portion 16 formed in the one end surface 14 of the ring gear 4 as a protrusion of the present invention and a circumferential groove 25 formed in the one side peripheral edge of the flange 3 of the differential case 2 as a recess of the present invention. In the present embodiment, the flange portion 16 is same as that of the second embodiment. Further, the circumferential groove 25 is formed in advance inside a bank 26 which is formed in the one side peripheral edge of the flange 3.

Figure 11:
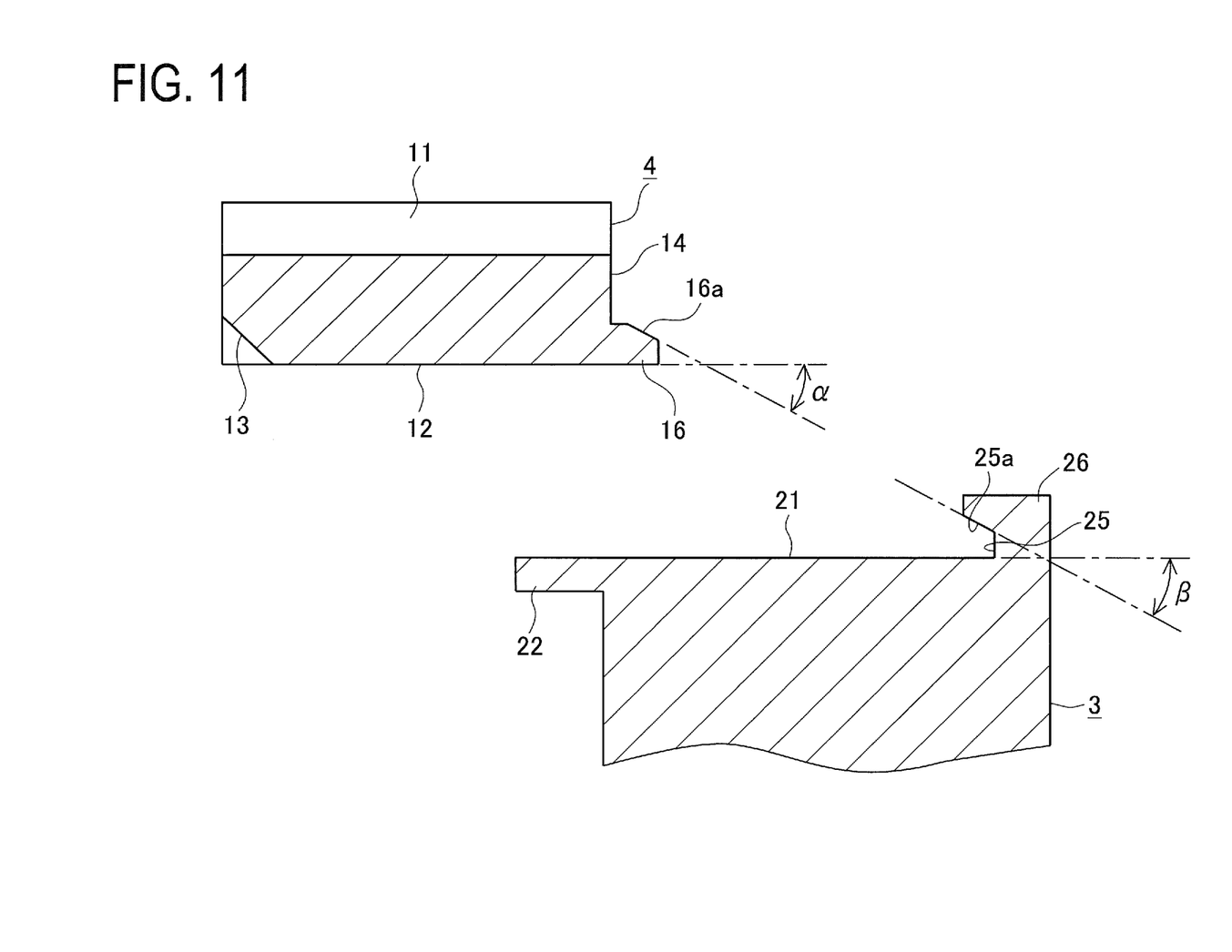
FIG. 11 is a schematic sectional view of the flange and the ring gear in a separated manner in the third embodiment.

FIG. 11 is a schematic sectional view of the flange 3 and the ring gear 4 in a separated manner. In the present embodiment, the flange portion 16 of the ring gear 4 is formed oblique to a press-fitting direction in which the ring gear 4 is press-fitted in the flange 3, and the flange portion 16 includes an engaging surface 16a to be engaged with an engaged surface 25a of a circumferential groove 25 of the flange 3. The engaging surface 16a has a predetermined angle of inclination α inclined with respect to the press-fitting surface 12. The engaged surface 25a of the circumferential groove 25 is formed oblique to the press-fitting direction of the ring gear 4 and has a predetermined angle of inclination β inclined with respect to the outer circumferential surface 21 of the flange 3. In the present embodiment, the inclination angle α of the engaging surface 16a is determined to be larger than the inclination angle β of the engaged surface 25a.

Then, as shown in FIG. 10, the flange portion 16 of the ring gear 4 is engaged with the circumferential groove 25 of the flange 3 so that the ring gear 4 can be restricted from deformation in the radial direction. The configuration of the first swage part 22 and the notches 13 is same as that of the first embodiment.

Figure 12:
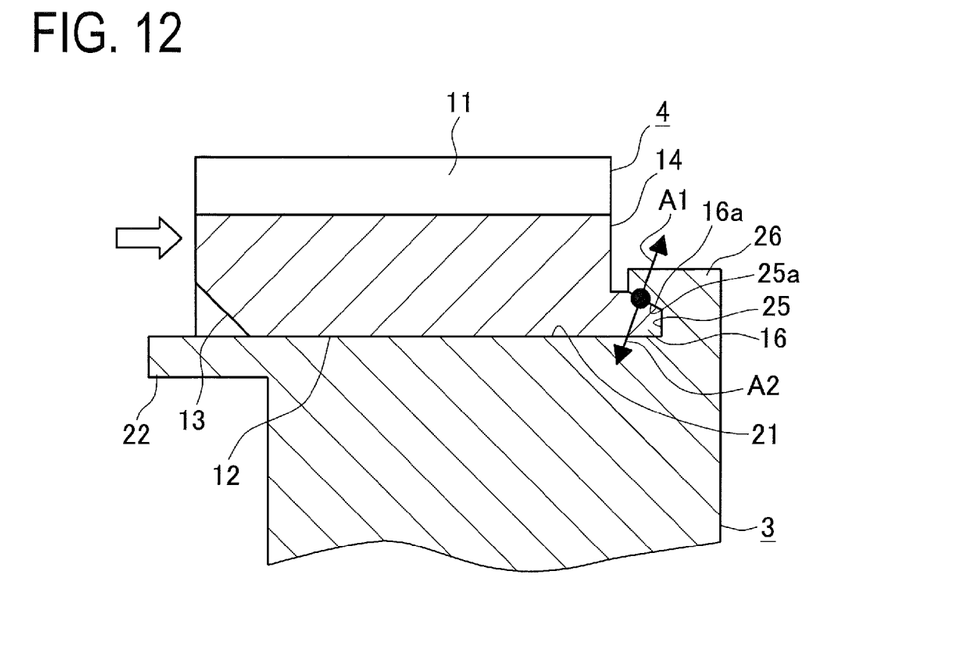
FIG. 12 is a schematic sectional view showing a press-fitting step of a fastening method in the third embodiment.
Figure 13:
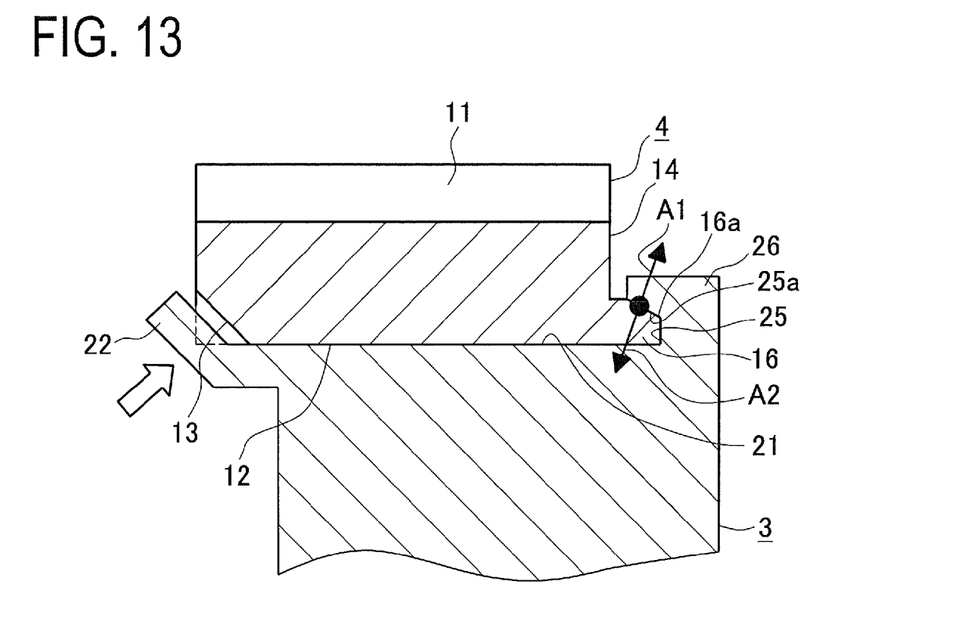
FIG. 13 is a schematic sectional view showing a swaging step of the fastening method in the third embodiment.

Next, a ring gear fastening method according to the present embodiment will be described. FIGS. 12 and 13 are schematic sectional views corresponding to FIG. 2, showing each step of the fastening method.

First, in a "press-fitting step" as shown in FIG. 12, the press-fitting surface 12 of the ring gear 4 is press-fitted on the outer circumferential surface 21 of the flange 3. At this time, the first swage part 22 of the flange 3 is in a horizontally flat shape in parallel with the outer circumferential surface 21. Then, the ring gear 4 is pressed until the flange portion 16 is engaged with the circumferential groove 25 of the flange 3 to be press-fitted. In this state, the press-fitting surface 12 of the ring gear 4 is in close contact with the outer circumferential surface 21 of the flange 3. Further, by press-fitting the flange portion 16 in the circumferential groove 25, the circumferential groove 25 is stretched out by the flange portion 16 due to a relationship between the inclination angle α of the engaging surface 16a and the inclination angle β of the engaged surface 25a. As a result, contact pressure indicated with arrows A1 and A2 is generated in between the engaging surface 16a and the engaged surface 25a as shown in FIG. 12.

After that, in a "swaging step" as shown in FIG. 13, the first swage part 22 of the flange 3 is pressed against the notches 13 of the ring gear 4 to be swaged. In this state, the ring gear 4 is positioned in place in the axial and radial directions with respect to the flange 3 and fixed therein.

Consequently, also in the present embodiment, the elastic deformation of the ring gear 4 can be restricted by the engagement of the flange portion 16 of the ring gear 4 and the circumferential groove 25 of the flange 3 even if the ring gear 4 tends to be elastically deformed in the radial direction due to the engagement reaction force. Accordingly, a part of the press-fitting surface 12 of the ring gear 4 is prevented from being separated from the outer circumferential surface 21 of the differential case 3, and thus the contact pressure of the press-fitting surface 12 can be kept uniform. As a result, reduction in total contact pressure on the press-fitting surface 12 can be restrained, so that the torque transmitted from the ring gear 4 to the differential case 2 is prevented from declining.

Further, in the present embodiment, the contact pressure is generated between the engaging surface 16a of the flange portion 16 and the engaged surface 25a of the circumferential groove 25 as shown in FIGS. 12 and 13, achieving the same effect with the second embodiment in which the flange portion 16 is swaged by the second swage part 23. Namely, the present embodiment enables to simplify the "swaging step" as achieving the swaging effect similar to the second embodiment.

The present invention is not limited to the above mentioned embodiments and can be partially modified as appropriate without departing from the essential scope of the invention.

INDUSTRIAL APPLICABILITY

The present invention may be applied to a differential sub-assembly used for a power transmission mechanism of a vehicle.

REFERENCE SIGNS LIST

1 Differential sub-assembly
2 Differential case
3 Flange
4 Ring gear
12 Press-fitting surface (Inner circumferential surface)
13 Notch
14 One end surface
15 Circumferential groove (Recess)
16 Flange portion (Protrusion)
16a Engaging surface
21 Outer circumferential surface
22 First swage part
23 Second swage part (Protrusion)
24 Circumferential groove (Recess)
25 Circumferential groove (Recess)

The invention claimed is:

1. A fastening structure of a ring gear to fasten the ring gear to a flange of a differential case constituting a differential sub-assembly, wherein
an inner circumferential surface of the ring gear is press-fitted to an outer circumferential surface of the flange,
the ring gear is swaged by a swaging part provided on at least one of both ends of the flange in an axial direction, and
the fastening structure includes an engaging device for engagement between the flange and the ring gear in a recess-and-protrusion relationship to prevent deformation of the ring gear in a radial direction wherein the inner circumferential surface of the ring gear is separated from the outer circumferential surface of the flange,
wherein the engaging device includes a protrusion formed in an end surface of the ring gear and a recess formed in the flange, the recess being configured in a manner that a protruding part formed in the flange is deformed by swaging.

2. A fastening structure of a ring gear to fasten the ring gear to a flange of a differential case constituting a differential sub-assembly, wherein
an inner circumferential surface of the ring gear is press-fitted to an outer circumferential surface of the flange, the ring gear is swaged by a swaging part provided on at least one of both ends of the flange in an axial direction, and the fastening structure includes an engaging device for engagement between the flange and the ring gear in a recess-and-protrusion relationship to prevent deformation of the ring gear in a radial direction wherein the inner circumferential surface of the ring gear is separated from the outer circumferential surface of the flange, wherein the engaging device includes a protrusion formed in an end surface of the ring gear and a recess formed in the flange, the recess being engaged with the protrusion when the ring gear is press-fitted to the outer circumferential surface of the flange.

3. A fastening structure of a ring gear to fasten the ring gear to a flange of a differential case constituting a differential sub-assembly, wherein an inner circumferential surface of the ring gear is press-fitted to an outer circumferential surface of the flange, the ring gear is swaged by a swaging part provided on at least one of both ends of the flange in an axial direction, and the fastening structure includes an engaging device for engagement between the flange and the ring gear in a recess-and-protrusion relationship to prevent deformation of the ring gear in a radial direction wherein the inner circumferential surface of the ring gear is separated from the outer circumferential surface of the flange, wherein the engaging device includes a protrusion formed in an end surface of the ring gear and a recess formed in the flange, the recess being engaged with the protrusion when the ring gear is press-fitted to the outer circumferential surface of the flange, the protrusion includes an engaging surface formed to be oblique with respect to a press-fitting direction of the ring gear and to be engaged with an engaged surface of the recess, the engaged surface is slanted with respect to the press-fitting direction of the ring gear, and the engaging surface has an angle of inclination larger than that of the engaged surface.

* * * * *